(12) United States Patent
Bhalerao et al.

(10) Patent No.: US 10,630,717 B2
(45) Date of Patent: Apr. 21, 2020

(54) MITIGATION OF WEBRTC ATTACKS USING A NETWORK EDGE SYSTEM

(71) Applicant: Avaya Inc., Basking Ridge, NJ (US)

(72) Inventors: Jaydeep Bhalerao, Pune (IN); Biswajyoti Pal, Navi Mumbai (IN); Manish Chatterjee, Calcutta (IN)

(73) Assignee: Avaya, Inc., Basking Ridge, NJ (US)

( * ) Notice: Subject to any disclaimer, the term of this patent is extended or adjusted under 35 U.S.C. 154(b) by 296 days.

(21) Appl. No.: 14/713,644

(22) Filed: May 15, 2015

(65) Prior Publication Data
US 2016/0337395 A1   Nov. 17, 2016

(51) Int. Cl.
*G06F 11/00*   (2006.01)
*H04L 29/06*   (2006.01)
*G06F 12/14*   (2006.01)

(52) U.S. Cl.
CPC ...... *H04L 63/1441* (2013.01); *H04L 63/0236* (2013.01)

(58) Field of Classification Search
CPC ........... H04L 29/08054; H04L 63/0218; H04L 63/20; H04L 65/1003; H04L 67/28; H04L 51/043; H04L 51/12; H04L 51/24; H04L 61/2575; H04L 61/2589; H04L 63/08; H04L 65/1069; H04L 65/4046; H04L 65/607
USPC ........................................ 709/228; 726/4, 23
See application file for complete search history.

(56) References Cited

U.S. PATENT DOCUMENTS

| | | | | |
|---|---|---|---|---|
| 8,613,089 B1* | 12/2013 | Holloway | ........... | H04L 63/1458 726/23 |
| 8,861,692 B1* | 10/2014 | Phelps | .................. | H04M 15/39 370/401 |
| 8,868,757 B1* | 10/2014 | Liu | ..................... | H04L 63/0281 709/220 |
| 2006/0235973 A1* | 10/2006 | McBride | ................. | H04L 67/20 709/226 |
| 2007/0121596 A1* | 5/2007 | Kurapati | ........... | H04L 29/06027 370/356 |
| 2012/0144023 A1* | 6/2012 | Guest | .................. | H04L 61/1511 709/224 |
| 2013/0152153 A1* | 6/2013 | Weiser | ................ | H04L 63/0236 726/1 |

(Continued)

OTHER PUBLICATIONS

Taking on WebRTC in an Enterprise, Alan Johnston, John Yoakum, and Kundan Singh, Avaya Inc, IEEE Communications Magazine, Apr. 2013.*

*Primary Examiner* — Gary S Gracia

(57) ABSTRACT

Embodiments disclosed herein provide systems and methods for mitigating attacks on a WebRTC system at the edge of an enterprise network. In a particular embodiment a method provides obtaining access criteria regarding access to a WebRTC system in the enterprise network, wherein the access criteria comprise instructions for allowing WebRTC connections with the WebRTC system. The method further provides receiving WebRTC signaling associated with WebRTC connections between the WebRTC system and endpoints having network addresses outside the enterprise network and blocking at least one connection associated with the WebRTC signaling from participating in WebRTC communications with the WebRTC system based on the access criteria.

20 Claims, 6 Drawing Sheets

(56) References Cited

U.S. PATENT DOCUMENTS

| | | | | |
|---|---|---|---|---|
| 2014/0095724 A1* | 4/2014 | Yoakum | ............ | H04L 29/08054 |
| | | | | 709/228 |
| 2014/0282903 A1* | 9/2014 | Singh | ...................... | H04L 63/08 |
| | | | | 726/4 |
| 2014/0283004 A1* | 9/2014 | Moore | ................ | H04L 63/0254 |
| | | | | 726/13 |
| 2014/0293046 A1* | 10/2014 | Ni | .......................... | H04N 7/181 |
| | | | | 348/143 |
| 2014/0325078 A1* | 10/2014 | Shan | ...................... | H04W 4/70 |
| | | | | 709/227 |
| 2014/0344169 A1* | 11/2014 | Phelps | ................. | G06Q 30/016 |
| | | | | 705/304 |
| 2014/0365676 A1* | 12/2014 | Yoakum | ............ | H04L 29/06469 |
| | | | | 709/231 |
| 2015/0039687 A1* | 2/2015 | Waxman | ................. | H04L 67/02 |
| | | | | 709/204 |
| 2015/0089046 A1* | 3/2015 | Waxman | ............... | H04L 49/206 |
| | | | | 709/224 |
| 2015/0113588 A1* | 4/2015 | Wing | ................. | H04L 63/0227 |
| | | | | 726/1 |
| 2015/0127759 A1* | 5/2015 | Siegel | ..................... | H04L 51/26 |
| | | | | 709/207 |
| 2015/0180748 A1* | 6/2015 | Ding | ..................... | H04L 41/046 |
| | | | | 709/224 |
| 2015/0180910 A1* | 6/2015 | van Bemmel | ...... | H04L 65/1069 |
| | | | | 709/227 |
| 2015/0208447 A1* | 7/2015 | Kim | .................... | H04L 65/1016 |
| | | | | 455/450 |
| 2015/0304359 A1* | 10/2015 | Balasaygun | ........ | H04L 65/1006 |
| | | | | 709/228 |

* cited by examiner

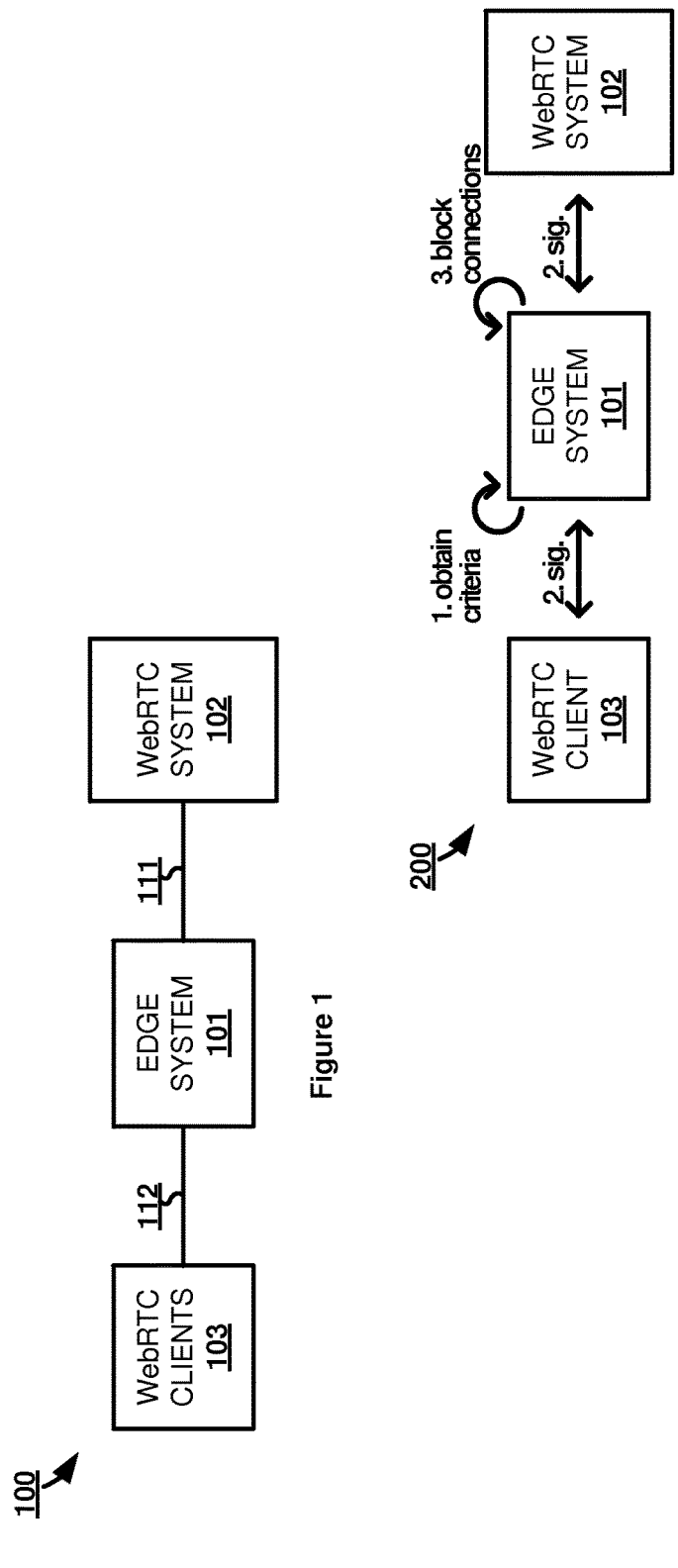
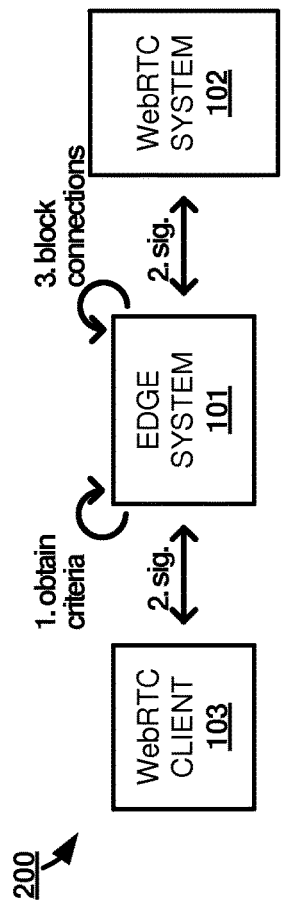
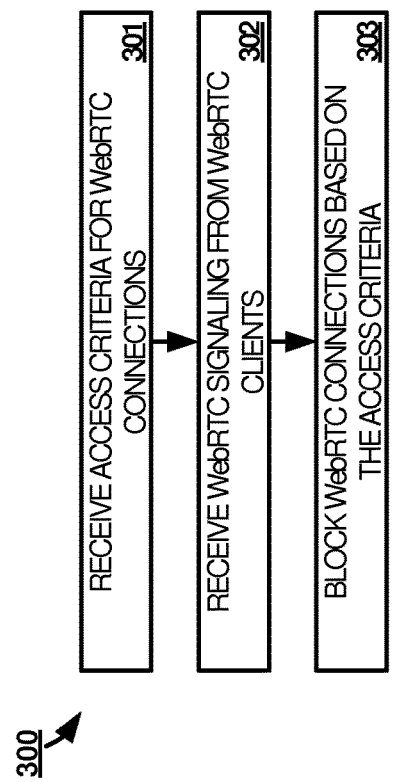

MITIGATION OF WEBRTC ATTACKS USING A NETWORK EDGE SYSTEM

TECHNICAL BACKGROUND

Web servers of almost any type are susceptible to attacks that render them unable to provide service for legitimate communication. Examples of such attacks include Denial of Service (DoS) and call walking attacks. In a DoS attacks, a malicious system generates web service requests and transfers those requests to a targeted web server. If the amount of service requests received by the targeted web server is great enough, the web server will be unable to handle the volume of requests. The attack requests therefore also prevent the web server from handling legitimate requests from other user systems.

Web Real Time Communication (WebRTC) servers, which provide real time communications to users over the web, are susceptible to attacks just like other web servers. In some cases, a WebRTC server may be placed within a network that may be used for more than just web traffic. For example, an enterprise may operate its own WebRTC server within its network that is used to facilitate WebRTC calls between clients within or outside of the enterprise's network. Even if the WebRTC server itself has the ability to mitigate attacks, traffic for the attacks still traverses at least a portion of the enterprise's network before reaching the WebRTC server. Thus, network resources are still used to transport attack communications before reaching the WebRTC server.

OVERVIEW

Embodiments disclosed herein provide systems and methods for mitigating attacks on a WebRTC system at the edge of an enterprise network. In a particular embodiment a method provides obtaining access criteria regarding access to a WebRTC system in the enterprise network, wherein the access criteria comprise instructions for allowing WebRTC connections with the WebRTC system. The method further provides receiving WebRTC signaling associated with WebRTC connections between the WebRTC system and endpoints having network addresses outside the enterprise network and blocking at least one connection associated with the WebRTC signaling from participating in WebRTC communications with the WebRTC system based on the access criteria.

In some embodiments, the access criteria include a threshold of WebRTC connections that are allowed from a particular network location and blocking the at least one connection comprises blocking all connections associated with WebRTC signaling from the particular network location once the threshold is reached.

In some embodiments, the method provides storing network characteristics of WebRTC connections with the WebRTC system in the edge system and applying the access criteria to the network characteristics when determining whether to block the at least one connection.

In some embodiments, the network characteristics include Internet Protocol (IP) addresses, IP address ranges, subnet identities, and physical locations of the WebRTC communications established with the WebRTC system.

In some embodiments, the access criteria includes first criteria and second criteria and blocking the at least one connection comprises automatically blocking connections associated with the WebRTC signaling that satisfy the first criteria and querying the WebRTC system for whether connections associated with the WebRTC signaling that satisfy the second criteria should be blocked.

In some embodiments, upon receiving indication from the WebRTC system that one or more of the connections associated with the WebRTC signaling that satisfy the second criteria should be blocked, the method provides blocking the one or more of the connections associated with the WebRTC signaling that satisfy the second criteria.

In some embodiments, in response to the querying, the WebRTC system transfers a test to each endpoint of the connections associated with the WebRTC signaling that satisfy the second criteria, wherein the test is used to determine whether each endpoint has a human operator.

In some embodiments, wherein the WebRTC system directs the edge system to block connections from endpoints of the connections associated with the WebRTC signaling that satisfy the second criteria that are determined to not have a human operator.

In some embodiments, obtaining the access criteria comprises receiving at least a portion of the access criteria via an out-of-band link between the edge system and the WebRTC system.

In some embodiments, the edge system comprises a Traversal Using Relays around NAT (Network Address Translation) server.

In another embodiment, an edge system is provided. The edge system includes a processing system configured to obtain access criteria regarding access to a WebRTC system in the enterprise network, wherein the access criteria comprise instructions for allowing WebRTC connections with the WebRTC system. The edge system further includes a communication interface configured to receive WebRTC signaling associated with WebRTC connections between the WebRTC system and endpoints having network addresses outside the enterprise network. The processing system is further configured to block at least one connection associated with the WebRTC signaling from participating in WebRTC communications with the WebRTC system based on the access criteria.

BRIEF DESCRIPTION OF THE DRAWINGS

FIG. 1 illustrates a WebRTC environment in an operational scenario.

FIG. 2 illustrates an operation of the WebRTC environment in the operational scenario.

FIG. 3 illustrates a method of operating the WebRTC environment in the operational scenario.

DETAILED DESCRIPTION

Figure 4:
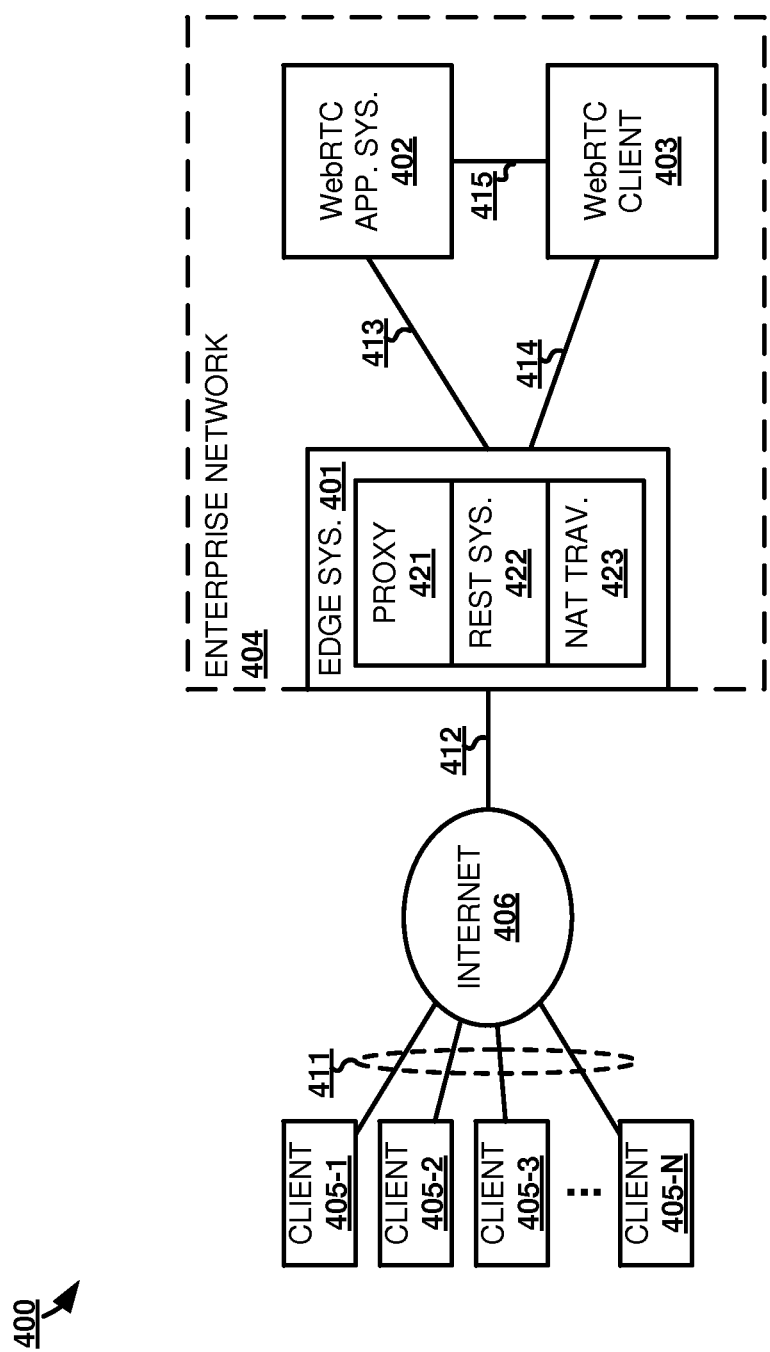
FIG. 4 illustrates another WebRTC environment in an operational scenario.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

WebRTC was developed to facilitate real-time communications, audio, video, or otherwise, between web browsers. In some cases, an enterprise will operate its own system for managing WebRTC communications and installs that system in its network. A typical characteristic with enterprise networks is that most of the network elements therein lay behind one or more edge systems. These edge systems are able to regulate communication traffic flowing into and out of the enterprise network. For example, an edge system may implement a firewall to protect adverse traffic, such as malware or undesired network services, from entering the enterprise network.

A WebRTC system that is located within an enterprise network is therefore also protected by such an edge system. However, current edge systems are not configured to protect a WebRTC system from attacks that a WebRTC system is likely to receive. In a particular example, a common type of attack on web servers, including WebRTC systems, is a denial of service attack (DoS) wherein a web server is inundated with requests that are generated by a malicious system to overwhelm the web server. When the web server is overwhelmed in such a way, the web server is unable to function properly to service legitimate requests. These attacks would look like normal WebRTC traffic to an edge system and would therefore be allowed into the enterprise network. Even if a WebRTC system is independently configured to handle DoS attacks, the traffic may adversely affect the enterprise network in other ways that the WebRTC system has no control over. For example, the DoS traffic would still be traversing the edge system and other enterprise network elements, and therefore using network resources, in order to reach the WebRTC system. Accordingly, the edge system provided herein is configured to mitigate DoS or other attacks on a WebRTC system before those attacks enter the enterprise network.

FIG. 1 illustrates WebRTC environment 100 in an operational scenario. WebRTC environment 100 includes edge system 101, WebRTC system 102, and one or more WebRTC clients 103. Edge system 101 and WebRTC clients 103 communicate over communication link(s) 111. Edge system 101 and WebRTC system 102 communicate over communication link 112.

In operation, WebRTC system 102 is located within an enterprise network that includes edge system 101 at an ingress/egress point of the enterprise network. It should be understood that, while the networks herein are described as enterprise networks, the term enterprise network is intended to describe any network having similar structure regardless of whether an enterprise operates the network. WebRTC system 102 may facilitate WebRTC communications between external WebRTC clients, such a clients 103, and other external WebRTC clients (not shown) or WebRTC clients, WebRTC gateways, or other type of system that communicates using WebRTC, that are located within the same enterprise network as WebRTC system 102. In one example, WebRTC system 102 may manage WebRTC communications between employees of an enterprise, such as call center agents, and people outside of the enterprise, such as customers.

WebRTC clients 103 may be user device endpoints that execute web browsing applications or dedicated WebRTC applications that allow the devices to exchange WebRTC communications with other endpoints via WebRTC system 102. For example, a user of one of WebRTC clients 103 may direct a web browser on the client 103 to a particular website and that website may include a button, link, or other selectable element, that the user selects to initiate a WebRTC communication (audio, video, text, or otherwise) with another WebRTC endpoint.

In some cases, one or more of clients 103 may be malicious systems that are configured to generate large amounts of WebRTC communications (e.g. connection requests) to overwhelm the capabilities of WebRTC system 102. These malicious systems prevent legitimate clients 103, as in the example above, from connecting to WebRTC system 102 and ultimately from connecting to a WebRTC endpoint. Accordingly, edge system 101 is provided as a barrier to mitigate the effects malicious communications on WebRTC system 101 and the enterprise network in which WebRTC system 101 is operating.

FIG. 2 illustrates an operation 200 of WebRTC environment 100 to mitigate WebRTC attacks on an enterprise network. At step 1, edge system 101 obtains access criteria regarding access to WebRTC system 102. The access criteria comprise instructions for allowing WebRTC connections with the WebRTC system. The access criteria may be preinstalled in edge system 101, may be received from another system, such as WebRTC system 102, may be received from a user, via user input into edge system 101 or via user input into another device or system with which edge system 101 communicates, or by some other means. The instructions may direct edge system 101 to block WebRTC connections from certain network addresses (e.g. specific addresses, address ranges, subnets, etc.), the instructions may include thresholds numbers of connections that, when exceeded, direct edge system 101 to block WebRTC connections, or some other type of instruction that provides parameters for blocking WebRTC connections—including combinations thereof. The thresholds may also apply to network connections from certain network addresses. For example, edge system 101 is instructed not to allow more than a given number of WebRTC connections from a given subnet. The subnets, address ranges, etc. may be explicitly defined by the access criteria (e.g. with particular addresses of known malicious systems) or may be defined in a more dynamic manner that allows edge system 101 to define the subnet, address range, etc. on its own (e.g. any subnet having a number of connections exceeding an access criteria threshold for blocking). Similarly, the access criteria may include white listed network spaces that should always be allowed.

Edge system 101 receives WebRTC signaling at step 2. The signaling is associated with WebRTC connections between the WebRTC system and WebRTC clients 103 having network addresses outside the enterprise network. The signaling may pertain to WebRTC connections at any point during a WebRTC communication session (e.g. initiation request, setup, teardown, ongoing, etc.). At step 3, edge system 103 blocks at least one connection associated with the WebRTC signaling from participating in WebRTC communications with WebRTC system 102 based on the access criteria. That is, edge system 102 uses information about the WebRTC signaling, such as the network address from which the signaling came, to determine whether a WebRTC connection associated with the signaling (e.g. media for user communications, further control signaling to establish user communications, or otherwise) satisfies the access criteria to be blocked. Using an example from above, the access criteria may indicate a range of network addresses that should be blocked and edge system 101 therefore blocks WebRTC connections associated with those addresses (e.g. connections with an endpoint having one of those addresses). Accordingly, WebRTC connections that are determined to be unwanted by WebRTC system 102 based on the access criteria are able to be blocked by edge system 101 before they reach WebRTC system 102. Additionally, edge system 101 may block connections that have already established with WebRTC system 102 but are later determined to be adverse, as may be the case when the number of connections from certain IP addresses exceeds a threshold.

Over time, the access criteria may continually be updated to block different WebRTC connections. For example, WebRTC system 102 may periodically update edge system 101 with information about WebRTC connections system 102 is servicing. Every time a connection is established or torn down WebRTC system 102 may send network information about those connections to edge system 101. Edge system 101 may then update an internal data structure of network connection information. The access criteria may be applied to the information in that data structure do determine whether any one connection or group of connections satisfies the access criteria and should be blocked. Thus, WebRTC system 102 is able to supply edge system 101 with connection information relevant to the access criteria, which edge system 101 may not be able to obtain otherwise.

FIG. 3 illustrates a method 300 of operating WebRTC environment 100 to mitigate WebRTC attacks on an enterprise network. In particular, method 300 provides edge system 101 obtaining access criteria regarding access to WebRTC system 102 in the enterprise network (step 301). The access criteria comprise instructions for allowing WebRTC connections with WebRTC system 102. The access criteria may be obtained from system administrator input, preinstalled in edge system 101, received from WebRTC system 102, or by some other means—including combinations thereof. The instructions may be explicit or may simply be information that edge system 101 uses to determine whether a particular connection to WebRTC system 102 should be allowed. For example, the instruction may explicitly instruct edge system 101 to block connections from certain IP addresses or may simply include an indication of certain IP addresses (e.g. an IP address range or subnet), which edge system 101 will already be programmed to understand as being IP addresses from which WebRTC connections are prohibited. Moreover, the access criteria may include information from WebRTC system 102 about clients that have already connected with WebRTC system 102 (e.g. requested a WebRTC session or are participating in a WebRTC session). For example, the information may include network addresses for the clients that have connected with WebRTC system 102. Edge system 101 can then use that information with the access criteria to determine whether to allow connections with WebRTC system 102.

Method 300 further provides edge system 101 receiving WebRTC signaling associated with WebRTC connections between the WebRTC system and endpoints having network addresses outside the enterprise network (step 302). In this example, the endpoints having network addresses (e.g. IP addresses) outside of the enterprise network are clients 103. The WebRTC connections associated with the signaling may be used for any type of communications necessary during any stage of a WebRTC communication whether the WebRTC communication is ongoing, establishing, tearing down, or otherwise. Additionally, the WebRTC signaling itself may comprise control communications (e.g. requests, responses, etc.), media packets for user communications (e.g. audio, video, text, etc.), or some other type of communications transferred between WebRTC systems and devices—including combinations thereof. Each type of communications may be carried over distinct connections, as they may be exchanged between different network elements (e.g. control communications may be exchanged with WebRTC system 102 while media communications are exchanged directly between endpoints). The connections traverse links 111 and 112 between elements 101-103.

Method 300 also provides edge system 101 blocking at least one connection associated with the WebRTC signaling from participating in WebRTC communications with WebRTC system 102 based on the access criteria (step 303). For example, the access criteria may indicate that connections with certain network addresses should be blocked. The addresses may be defined individually, as a range of addresses, by subnet, or some other way of describing network addresses. Alternatively, the access criteria may indicate that only a threshold number of connections can be established from within a group of network addresses. Other ways of denoting which connections should be blocked may also be used. If edge system 101 determines that a connection should be blocked, then edge system 101 blocks any further communications on the connection from entering the enterprise network and reaching WebRTC system 102. In some cases, edge system 101 may block outgoing communications on the connection as well.

As noted above, WebRTC connections may correspond to WebRTC communications at any stage. Therefore, a blocked connection may prevent a WebRTC communication from establishing or may disconnect an already established WebRTC communication. The type of communications blocked may depend on the access criteria. That is, if the access criteria indicates a threshold number of connections, then new WebRTC communications are prevented from establishing. Alternatively, if the access criteria indicates that no connections are allowed for certain network addresses, then edge system 101 may block already established WebRTC communications.

Referring back to FIG. 1, Edge system 101 comprises a computer processing system and communication interface. Edge system 101 may also include other components such as a router, server, data storage system, and power supply. Edge system 101 may reside in a single device or may be distributed across multiple devices. Edge system 101 may comprise a communication gateway, firewall, Traversal Using Relays around NAT (Network Address Translation) (TURN) server, Representational State Transfer (REST) server, proxy server, or some other networking system—including combinations thereof.

WebRTC system 102 comprises a computer processing system and communication interface for facilitating WebRTC communications. WebRTC system 102 may also include other components such as a router, server, data storage system, and power supply. WebRTC system 102 may reside in a single device or may be distributed across multiple devices.

WebRTC clients 103 each comprise communication circuitry and processing circuitry. The communication circuitry may include wired communication components and/or wireless communication components, such as an amplifier, filter, modulator, and signal processing circuitry. WebRTC clients 103 may also include a user interface, memory device, software, or some other communication components.

WebRTC clients 103 may be a telephone, tablet, watch, computer, e-book, mobile Internet appliance, network interface card, media player, game console, or some other communication apparatus—including combinations thereof.

Communication links 111 and 112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111 and 112 could be direct links or may include intermediate networks, systems, or devices.

FIG. 4 illustrates WebRTC environment 400 in an operational scenario. WebRTC environment 400 includes edge system 401, WebRTC application system 402, and WebRTC client system 403, which are included in enterprise network 404. Edge system 401 includes proxy system 421, REST system 422, and NAT traversal system 423. WebRTC environment 400 further includes client devices 405 and Internet 406. Client device 405 and Internet 406 communicate over communication links 411. Internet 406 and edge system 401 communicate over communication link 412. Edge system 401 and WebRTC application system 402 communicate over communication link 413. Edge system 401 and WebRTC client system 403 communicate over communication link 414. WebRTC client system 403 and WebRTC application system 402 communicate over communication link 415.

Ideally, client devices 405 each comprise user devices configured to use WebRTC to exchange user communications with WebRTC client system 403 (e.g. via a web browser or dedicated WebRTC application executing thereon) and facilitated by WebRTC application system 402. WebRTC client system 403 may include one or more client devices operated by users, such as contact center agents that are associated with the enterprise, a Session Initiation Protocol (SIP) gateway, an H.323 gateway, or any other type of system that can act as a WebRTC endpoint. In some cases, at least one of clients 405 may include systems configured for malicious communications with WebRTC application system 402. For example, client device 405-3 may be a server or other type of computer system configured to generate and transfer a large number of WebRTC communication requests in an effort to overload WebRTC application system 402.

Figure 5:
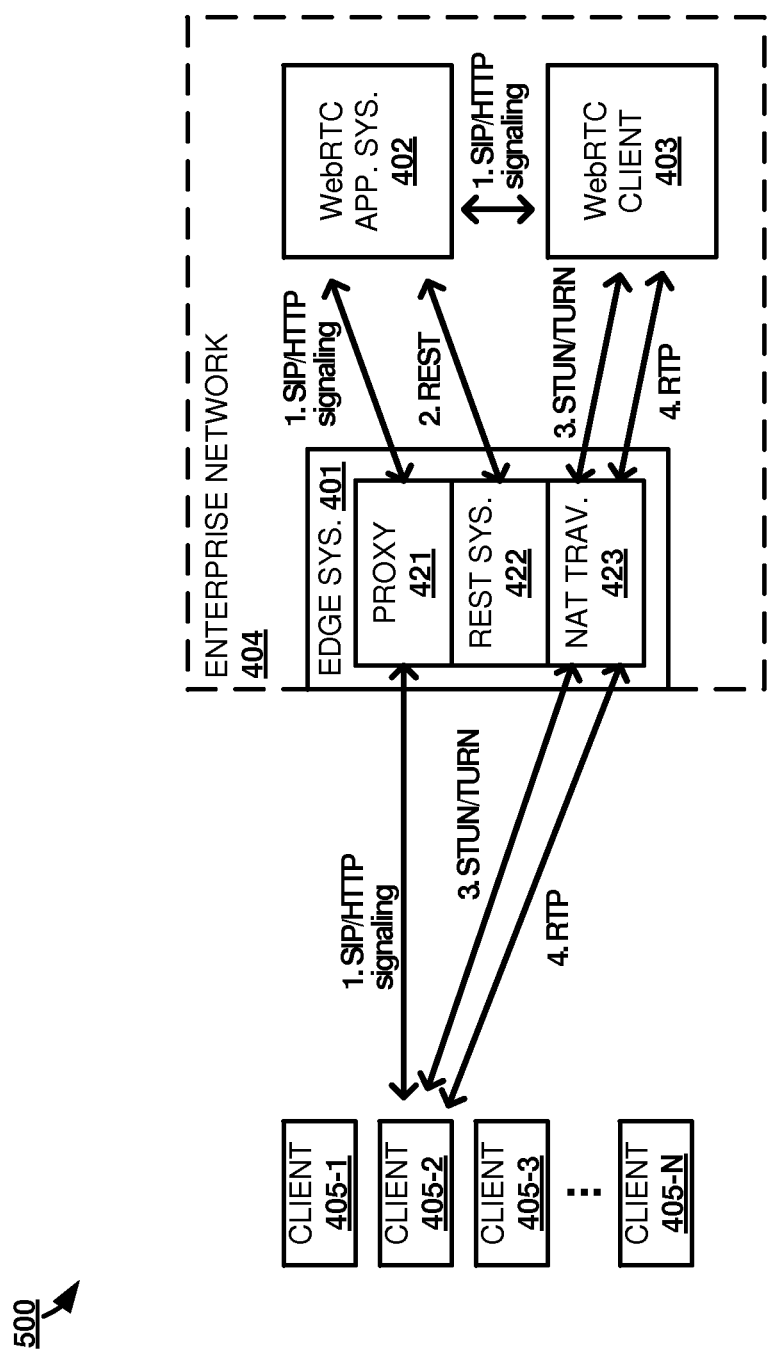
FIG. 5 illustrates an operation of the other WebRTC environment in the operational scenario.

FIG. 5 illustrates an operation 500 of WebRTC environment 400 to mitigate WebRTC attacks on an enterprise network. Client device 405-3 is used as an example, although, similar steps are applied to signaling with any of client devices 405. At step 1, client device 405-3 attempts to initiate a WebRTC call with WebRTC client system 403. The signaling used to initiate the WebRTC call may be based on SIP or some other proprietary signaling format that can be transferred over Hypertext Transfer Protocol (HTTP). The call may be initiated in response to an instruction by the user of WebRTC client device 405-3. Proxy 421 allows the signaling to pass through edge system 401 on its way to or from WebRTC application system 402. Additionally, signaling is transferred between WebRTC application system 402 and WebRTC client system 403, which will be the endpoint for the call and may be specifically identified by the call request from client device 405-3 or may be selected from multiple endpoints by system 402. While Internet 406 is not shown in operation 500, it should be understood that the signaling between client devices 405 and enterprise network 404 traverse Internet 406.

During the signaling exchange used to initiate, establish, and otherwise manage the requested WebRTC call, WebRTC application server 402 identifies network information about the client device 405-3 and transfers the network information to edge system 401 using REST at step 2. The network information may include one or more network addresses associated with the signaling. The network addresses may be an IP address of client device 405-3, an IP address of an intermediate system between client device 405-3, or some other network address that may be useful when determining whether communication connections from such address should be allowed—including combinations thereof. The network information may be obtained via HTTP header information in packets used to transfer the signaling at step 1 or may be explicitly requested from the sender, as may be the case if a WebRTC application configured to respond to such network information requests is being used on client device 405-3 rather than using a web browser. Edge system 401 may add the network information to its own storage system and may use that stored network information when applying access criteria, as described further below.

At step 3, client device 405-3 and client system 403 exchange TURN or Session Traversal Utilities for NAT (STUN) signaling via a connection through NAT traversal system 423 to establish and maintain real-time user communications for the call between the two endpoints 405-3 and 403. Those real-time communications are then exchanged through NAT traversal system 423 at step 4 using the Real-time Transport Protocol (RTP). At any point during operation 500, edge system 401 may determine that the access criteria indicates that the connections with client device 405-3 should be blocked. For example, if the criteria is satisfied at the time the call is initiated in step 1, then the call may be blocked at that point. However, if the criteria is not satisfied until later in operation 500, as may be the case if additional connections are needed to eventually satisfy the access criteria, then connections with client device 405-3 may be blocked at that later stage.

While illustrated sequentially, it should be understood that steps 1-4 may occur out of order or may occur concurrently. For example, signaling exchanged in steps 1-3 may still be exchanged during step 4. When the call ends REST signaling from step 2 may be transferred from WebRTC application system 402 to edge system 401 informing edge system 402 that the call has ended and the network information associated with that call is not longer associated with an active call. Edge system 401 may then erase the network information or may keep the network information if it would remain useful for when applying the access criteria (e.g. when access criteria applies to a threshold number of connections over time regardless of whether those connections are active).

Figure 6:
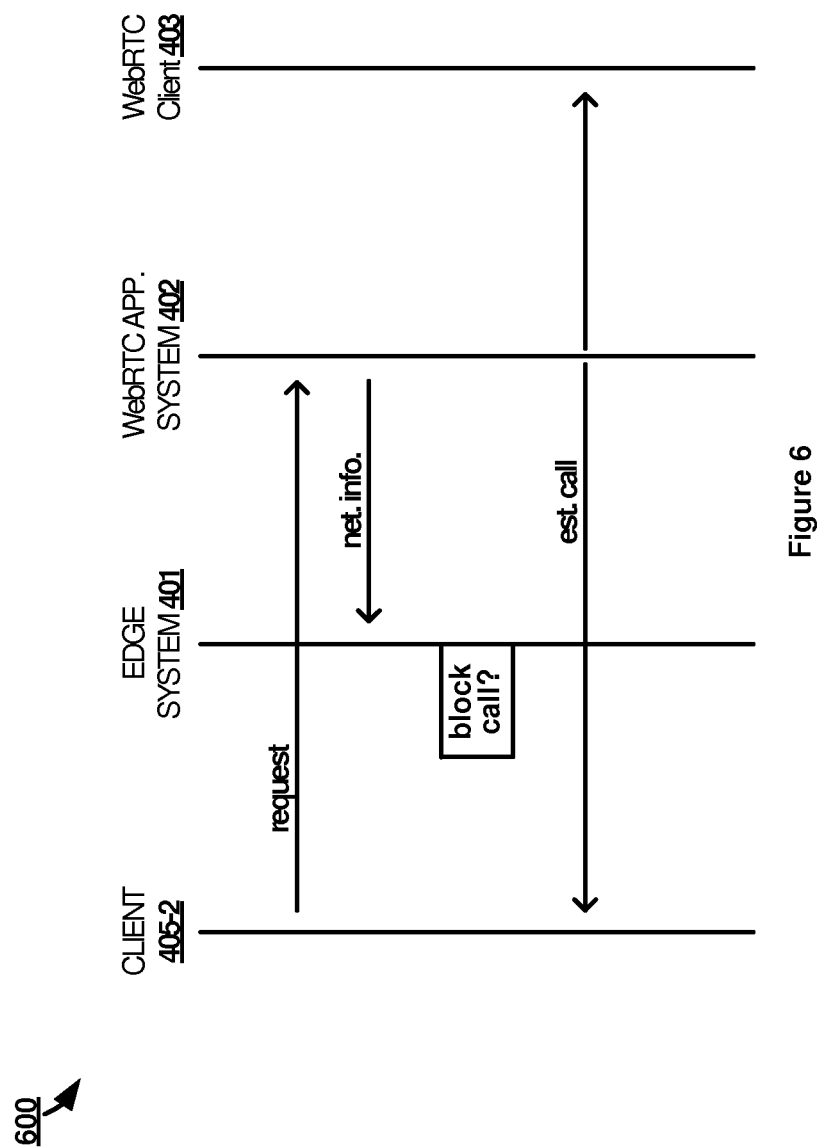
FIG. 6 illustrates an operation of the other WebRTC environment in the operational scenario.

FIG. 6 illustrates an operation 600 of WebRTC environment 400 to mitigate WebRTC attacks on an enterprise network. Operation 600 is also described using WebRTC client device 405-3 but the same operation applies to connections with any of client devices 405-3. In this example, operation 600 begins with WebRTC client device 405-3 transferring a request for a WebRTC call to WebRTC application system 402 via edge system 401 into enterprise network 404. As in operation 500, the request may be SIP or some other type of message that can be transferred over HTTP.

WebRTC application system 402 transfers network information regarding that call request to edge system 401 using an out of band interface with REST system 422. Edge system 401 uses that network information to update its own storage and applies access criteria to the call request to determine whether to block the call. By collecting and storing network information for all the call requests and call connections facilitated by WebRTC application system 402, edge system 401 is able to compile a view of all the connections with WebRTC application system 402, such as which network addresses the connections originate from or otherwise pass through. From this network view, edge system 401 is able to determine metrics relevant to access criteria.

For example, the criteria may indicate a threshold number of connections that are allowed from one network subnet. Edge system 401 can therefore analyze the network information it has stored to determine whether any subnets have enough connections to exceed that threshold. Thus, if the call request from WebRTC client device 405-3 would cause the threshold to be exceeded, then edge system 401 would block connections from WebRTC client device 405-3 from entering enterprise network 404 and reaching WebRTC application system 405. In contrast, if the network information about the WebRTC call from client device 405-3 does not satisfy the access criteria and is not blocked, then a RTP connection can be established with WebRTC client system 403 as the other endpoint for the WebRTC call.

Preferably, the access criteria is defined such that, if the call from client device 405-3 is a legitimate call request (e.g. initiated by a live user), then the call connection will not be blocked. For example, thresholds for the number of connections that are allowed from within a given network address range may be set to a high value that makes it very unlikely that it would be exceeded by legitimate calls. However, in some cases, the confidence over whether a call connection should be blocked may not be high enough to warrant simply blocking the call connection. Operation 700 described below accounts for this uncertainty.

Figure 7:
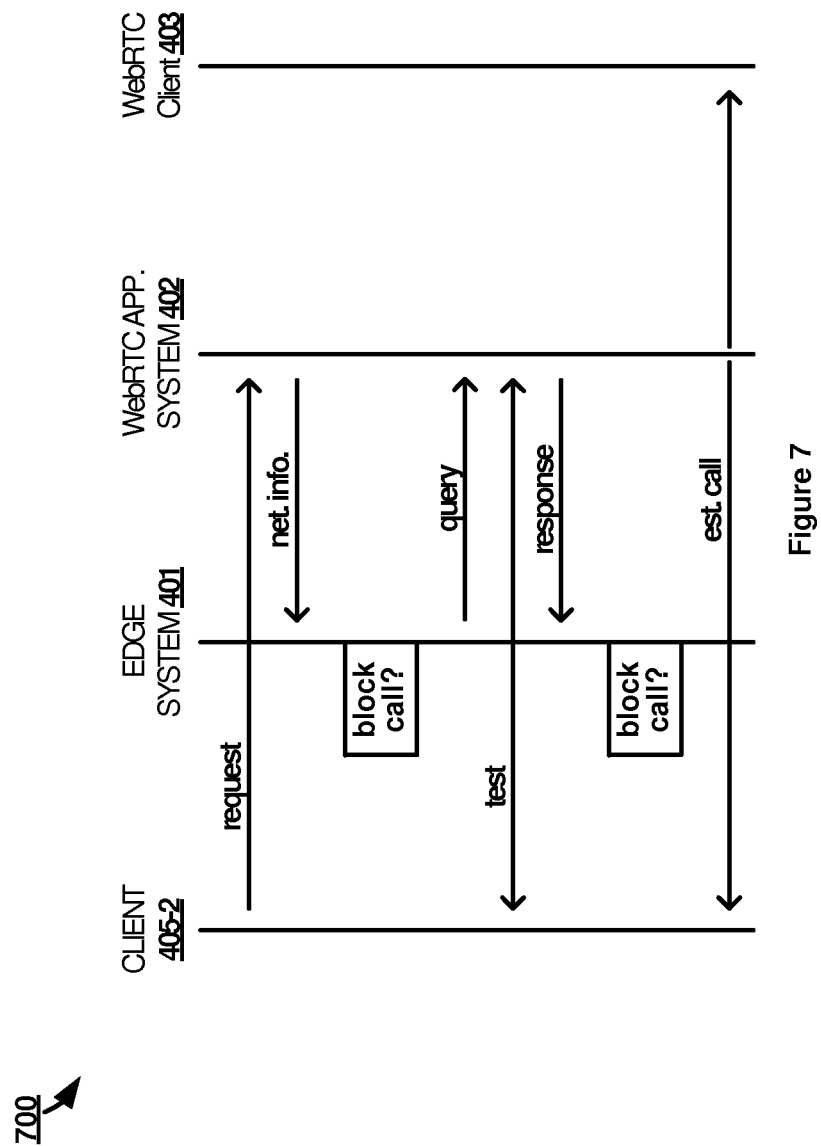
FIG. 7 illustrates an operation of the other WebRTC environment in the operational scenario.

FIG. 7 illustrates operation 700 of WebRTC environment 400 to mitigate WebRTC attacks on an enterprise network. The first portion of operation 700 proceeds much like operation 600 from above in that a request for a WebRTC call is transferred from WebRTC client device 405-3 to WebRTC application system 402 and system 402 reports network information to edge system 401. In this example, the access criteria indicates that further information is necessary to determine whether the call should be blocked. For instance, the access criteria may include multiple thresholds. One threshold is a higher threshold whereby calls are automatically blocked when the threshold is exceeded. Another threshold is a lower threshold whereby a call that would make the amount of calls fall between the lower and the higher threshold may still be malicious. Alternatively, the call may be coming from a geographic region (as indicated by the network address or otherwise) that has a high propensity for malicious attacks while also having the potential for legitimate calls.

Regardless of the nature of the access criteria, edge system 401 queries WebRTC application system 402 about whether to block calls that the access criteria indicates are uncertain for being blocked. In response to the query, WebRTC system 402 transfers a test to client device 405-3 in order to determine whether client device 405-3 is being operated by a human user. The test may be a Completely Automated Public Turing test to tell Computers and Humans Apart (CAPTCHA), a request for login credentials, or some other way of requiring input that only a human operator would likely be able to provide. Accordingly, client device 405-3 responds to the test and, if the response indicates that client device 405-3 has a human operator, then WebRTC system 402 in turn responds to edge system 401 with an indication that the call should be allowed. Edge system 401 allows the call to be established with WebRTC client system 403 accordingly. However, if client device 405-3's response to the test does not indicate that client device 405-3 has a human operator, then WebRTC system 402 in turn responds to edge system 401 with an indication that the call should be blocked.

Figure 8:
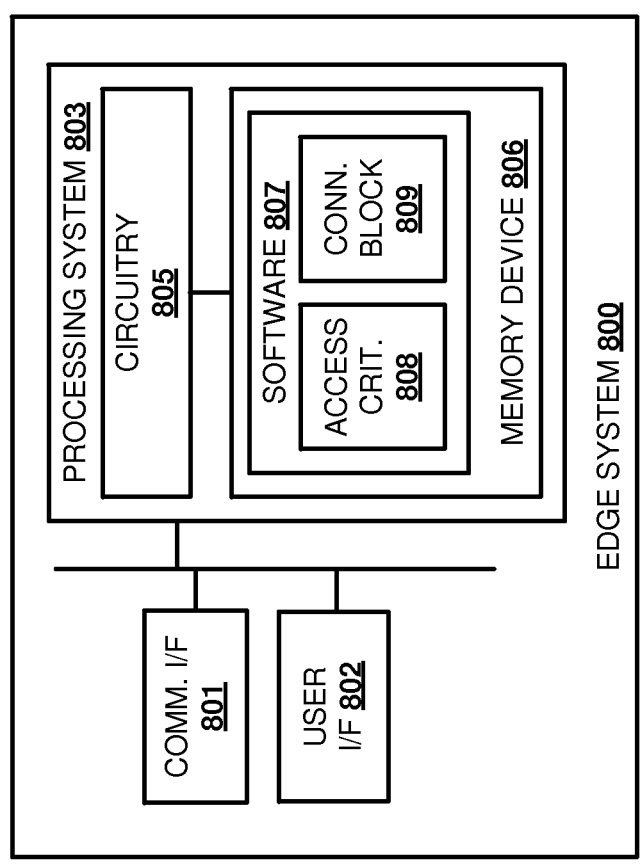
FIG. 8 illustrates an edge system in an operational scenario.

FIG. 8 illustrates edge system 800. Edge system 800 is an example of edge systems 101 and 401, although systems 101 and 401 may use alternative configurations. Edge system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes access criteria module 808 and connection blocking module 809. Operating software 807 may further include an operating system, utilities, drivers, network interfaces, applications, or some other type of software. When executed by circuitry 805, operating software 807 directs processing system 803 to operate edge system 800 as described herein.

In particular, access criteria 808 directs processing system 803 to obtain access criteria regarding access to a WebRTC system in the enterprise network, wherein the access criteria comprise instructions for allowing WebRTC connections with the WebRTC system. Connection blocking module 809 directs processing system 803 to receive WebRTC signaling associated with WebRTC connections between the WebRTC system and endpoints having network addresses outside the enterprise network and block at least one connection associated with the WebRTC signaling from participating in WebRTC communications with the WebRTC system based on the access criteria.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an edge system located at an edge of an enterprise network, which regulates communication traffic flowing into and out of the enterprise network, to mitigate Web Real Time Communication (WebRTC) attacks on the enterprise network, the method comprising:

obtaining access criteria regarding access to a WebRTC system in the enterprise network, wherein the access criteria comprise instructions for allowing WebRTC connections with the WebRTC system;

in the edge system, passing to the WebRTC system WebRTC signaling comprising WebRTC connection requests to establish WebRTC connections between the WebRTC system and endpoints having network addresses outside the enterprise network;

in the edge system, receiving network information regarding the WebRTC connection requests from the WebRTC system, wherein the WebRTC system provides the network information in response to being passed the WebRTC signaling; and in the edge system, blocking at least one connection of the WebRTC connections from participating in WebRTC communications with the WebRTC system based on application of the access criteria to the network information.

2. The method of claim 1, wherein the access criteria include a threshold of WebRTC connections that are allowed from a particular network location and wherein blocking the at least one connection comprises:

blocking all of the WebRTC connections that are from the particular network location once the threshold is reached.

3. The method of claim 1, further comprising:

storing network characteristics of past WebRTC connections with the WebRTC system in the edge system; and applying the access criteria to the network characteristics when determining whether to block the at least one connection.

4. The method of claim 3, wherein the network characteristics include Internet Protocol (IP) addresses, IP address ranges, subnet identities, and physical locations of the WebRTC communications established with the WebRTC system.

5. The method of claim 1, wherein the access criteria includes first criteria and second criteria, and wherein blocking the at least one connection comprises:

automatically blocking first connections of the WebRTC connections that satisfy the first criteria; and querying the WebRTC system for whether second connections of the WebRTC connections that satisfy the second criteria should be blocked.

6. The method of claim 5, further comprising:

upon receiving indication from the WebRTC system that one or more of the second connections should be blocked, blocking the one or more of the second connections.

7. The method of claim 5, wherein, in response to the querying, the WebRTC system transfers a test to each endpoint of the second connections, wherein the test is used to determine whether each endpoint has a human operator.

8. The method of claim 7, wherein the WebRTC system directs the edge system to block connections from endpoints of the second connections that are determined to not have a human operator.

9. The method of claim 1, wherein obtaining the access criteria comprises receiving at least a portion of the access criteria via an out-of-band link between the edge system and the WebRTC system.

10. The method of claim 1, wherein the edge system comprises a Traversal Using Relays around NAT (Network Address Translation) server.

11. An edge system in an enterprise network, which regulates communication traffic flowing into and out of an enterprise network, to mitigate Web Real Time Communication (WebRTC) attacks on an enterprise network, the method comprising:

a processing system configured to obtain access criteria regarding access to a WebRTC system in the enterprise network, wherein the access criteria comprise instructions for allowing WebRTC connections with the WebRTC system;

a communication interface configured to pass to the WebRTC system WebRTC signaling comprising WebRTC connection requests to establish WebRTC connections between the WebRTC system and endpoints having network addresses outside the enterprise network and receive network information regarding the WebRTC connection requests from the WebRTC system, wherein the WebRTC system provides the network information in response to being passed the WebRTC signaling; and a processing system configured to block at least one connection of the WebRTC connections from participating in WebRTC communications with the WebRTC system based on application of the access criteria to the network information.

12. The edge system of claim 11, wherein the access criteria include a threshold of WebRTC connections that are allowed from a particular network location and wherein the processing system configured to block the at least one connection comprises:

the processing system configured to block all of the WebRTC connections that are from the particular network location once the threshold is reached.

13. The edge system of claim 11, further comprising:

a storage system configured to store network characteristics of past WebRTC connections with the WebRTC system in the edge system; and the processing system configured to apply the access criteria to the network characteristics when determining whether to block the at least one connection.

14. The edge system of claim 13, wherein the network characteristics include Internet Protocol (IP) addresses, IP address ranges, subnet identities, and physical locations of the WebRTC communications established with the WebRTC system.

15. The edge system of claim 11, wherein the access criteria includes first criteria and second criteria, and wherein the processing system configured to block the at least one connection comprises:

the processing system configured to automatically block first connections of the WebRTC connections that satisfy the first criteria and query the WebRTC system for whether second connections of the WebRTC connections that satisfy the second criteria should be blocked.

16. The edge system of claim 15, further comprising:
upon receiving indication from the WebRTC system that one or more of the second connections should be blocked, the processing system is configured to block the one or more of the second connections.

17. The edge system of claim 15, wherein, in response to the querying, the WebRTC system transfers a test to each endpoint of the second connections, wherein the test is used to determine whether each endpoint has a human operator.

18. The edge system of claim 17, wherein the WebRTC system directs the edge system to block connections from endpoints of the second connections that are determined to not have a human operator.

19. The edge system of claim 11, wherein the processing system configured to obtain the access criteria comprises the processing system configured to receive at least a portion of the access criteria via an out-of-band link between the communication interface and the WebRTC system.

20. The edge system of claim 11, wherein the edge system comprises a Traversal Using Relays around NAT (Network Address Translation) server.

* * * * *